(12) United States Patent
Gilliland et al.

(10) Patent No.: US 6,530,699 B1
(45) Date of Patent: Mar. 11, 2003

(54) DUAL CHANNEL DEVICE HAVING TWO OPTICAL SUB-ASSEMBLIES

(75) Inventors: Patrick B. Gilliland, Chicago, IL (US); Carlos Jines, Chicago, IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/938,135

(22) Filed: Aug. 22, 2001

(51) Int. Cl.$^7$ .............................. G02B 6/42; G02B 6/43
(52) U.S. Cl. .............................. 385/88; 385/89; 385/92
(58) Field of Search ..................................... 385/88–94

(56) References Cited

U.S. PATENT DOCUMENTS

| | | | | |
|---|---|---|---|---|
| 5,596,665 A | * | 1/1997 | Kurashima et al. ........... | 385/92 |
| 5,638,390 A | | 6/1997 | Gilliland et al. .............. | 372/38 |
| 5,812,582 A | | 9/1998 | Gilliland et al. .............. | 372/50 |
| 5,815,623 A | | 9/1998 | Gilliland et al. .............. | 385/93 |
| RE36,491 E | | 1/2000 | Gilliland et al. .............. | 372/38 |
| 6,213,651 B1 | | 4/2001 | Jiang et al. ................... | 385/92 |
| 6,331,992 B1 | * | 12/2001 | Gilliland et al. .............. | 372/50 |
| 6,349,105 B1 | * | 2/2002 | Gilliland et al. .............. | 372/50 |
| 6,358,066 B1 | * | 3/2002 | Gilliland et al. ........... | 439/76.1 |
| 6,416,238 B1 | * | 7/2002 | Gilliland et al. .............. | 385/88 |

* cited by examiner

Primary Examiner—John D. Lee
Assistant Examiner—Sarah U Song
(74) Attorney, Agent, or Firm—Karl D. Kovach (57) ABSTRACT

An optoelectronic device includes two optical subassemblies mounted on an edge of a substrate. Electronic circuitry is mounted on the substrate. The two optical packages are electrically connected to the electrical circuitry. An optical coupling element is attached to one of the optical packages and another optical coupling element is attached to the other optical package. A rib is attached to the substrate and to one of the optical coupling elements so as to provide support for the optical coupling element, and another rib is attached to the substrate and to the other optical coupling element. Each optical coupling element has a respective ferrule receiving bore. The ferrule receiving bores are parallel to one another. A connection pin header is electrically connected to the electronic circuitry on the substrate. The connection pin header includes connection pins.

16 Claims, 12 Drawing Sheets

DUAL CHANNEL DEVICE HAVING TWO OPTICAL SUB-ASSEMBLIES

BACKGROUND OF THE INVENTION

1. Field of the Invention

The present invention pertains to optoelectronic devices. The invention more particularly concerns a high density optoelectronic device such as an array which includes multiple modular transmitters and/or receivers.

2. Discussion of the Background

Optoelectronic devices such as optical transceivers are known in the art and include active optical devices or diode packages. Common diode packages include LED packages such as a TO-46 package or a 5.6 mm TO style laser diode package such as an RLD-85PC diode package by Rohm, Incorporated. These diode packages or TO cans typically include a metallic housing having a laser diode or LED for transmitting data and a photo diode for performing power-monitoring, metal contact leads exiting from the diodes for connection to a power source and a cover glass opposed to the diode, through which the energy is transmitted. Discussion of the power-monitoring and feedback control of the laser diode by the photo diode is presented in U.S. Pat. Nos. 5,812,582 and 5,815,623. U.S. Pat. Nos. 5,812,582 and 5,815,623 are hereby incorporated herein by reference.

Smaller optoelectronic packages or optical subassemblies allow the devices into which the optoelectronic packages are placed to become smaller. Smaller optoelectronic packages allow for a higher density of data transmission in a given space. Currently, there is a great demand for optoelectronic devices which incorporate small optoelectronic packages. However, the design of such devices is complicated due to the limitations on the space involved and the small size of the components employed.

SUMMARY OF THE INVENTION

Therefore, it is an object of the present invention to provide a high density optoelectronic device or array which includes optoelectronic subassemblies such as transmitters and receivers.

It is still another object of the invention to provide an optoelectronic device which includes modular components so as to enable the custom assembly of an array of transmitters or an array of receivers or an array of a combination of transmitters and receivers.

It is yet another object of the invention to provide an optoelectronic device which is structurally robust and reliable despite its reduced size.

It is a further object of the invention to provide an optoelectronic device which is easy to install, and provides for more efficient utilization of limited space.

In one form of the invention, the dual channel optoelectronic device includes two optical packages electrically connected to an edge of a substrate. Whereon the substrate includes electronic circuitry. Two optical coupling elements are attached to the two optical packages. A first rib is connected to the substrate and to one of the two optical coupling elements so as to support the optical coupling element. A second rib is connected to the substrate and to the other of the two optical coupling elements so as to provide support thereto. Additionally, a connection pin header having connection pins is attached to the substrate and is electrically connected to the electronic circuitry on the substrate.

In another form of the invention, the device is an optoelectronic module which includes a housing, a cover, and four optical packages insertable into the housing.

Thus, the device of the invention is superior to existing optoelectronic devices that include optoelectronic packages. The modular high density multiple transmitter/receiver arrays of the invention eliminates the use of large, bulky components, and replaces them with a smaller component through use of a unique combination of materials and arrangement of the materials. Thus, the device of the invention is smaller than prior art devices.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings.

DETAILED DESCRIPTION OF THE PRESENTLY PREFERRED EMBODIMENT

Referring now to the drawings, wherein like reference numerals designate identical or corresponding parts throughout the several views, and more particularly to FIGS. 1-12 thereof, is a modular, high-density, multiple optical transmitter/receiver array or optoelectronic device or module 30 and a dual channel optoelectronic device 40 mounted within the array 30.

Figure 1:
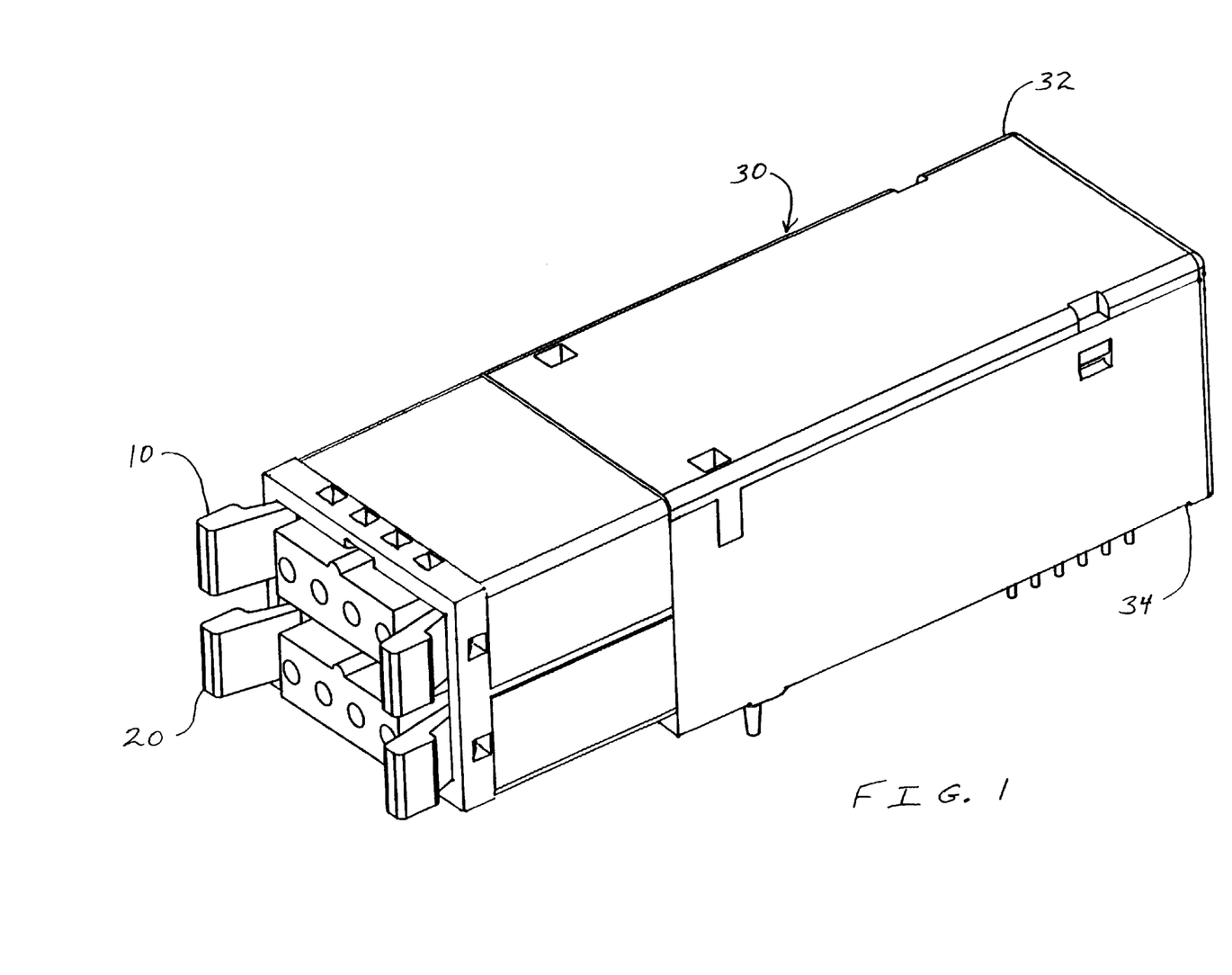
FIG. 1 is a perspective view of an optoelectronic device or transceiver array and associated plugs.

FIG. 1 is a perspective view of the module 30 which includes a housing 34, and a cover 32. Also shown are a first plug 10, and a second plug 20.

Figure 2:
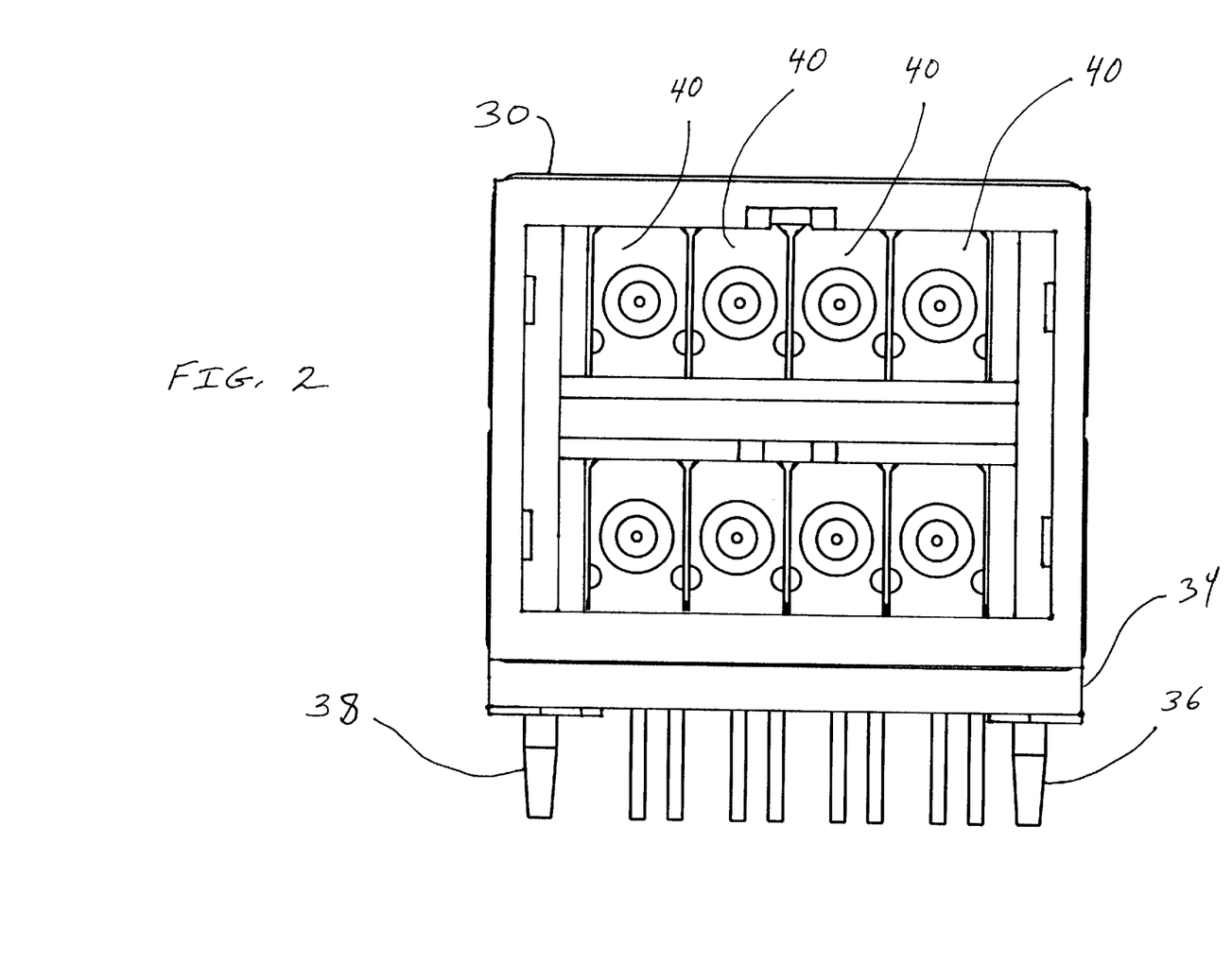
FIG. 2 is a plan view of an end of the optoelectronic transceiver array of FIG. 1 with the plugs removed.

FIG. 2 is a plan view of an end of the model 30 with the first and second plugs 10, 20 removed. Shown within the housing 34 are four dual channel optoelectronic devices 40. The housing also includes a first alignment pin 36 and a second alignment pin 38. The alignment pins 36, 38 align the module 30 to a printed circuit board to which the module is mounted.

Figure 3:
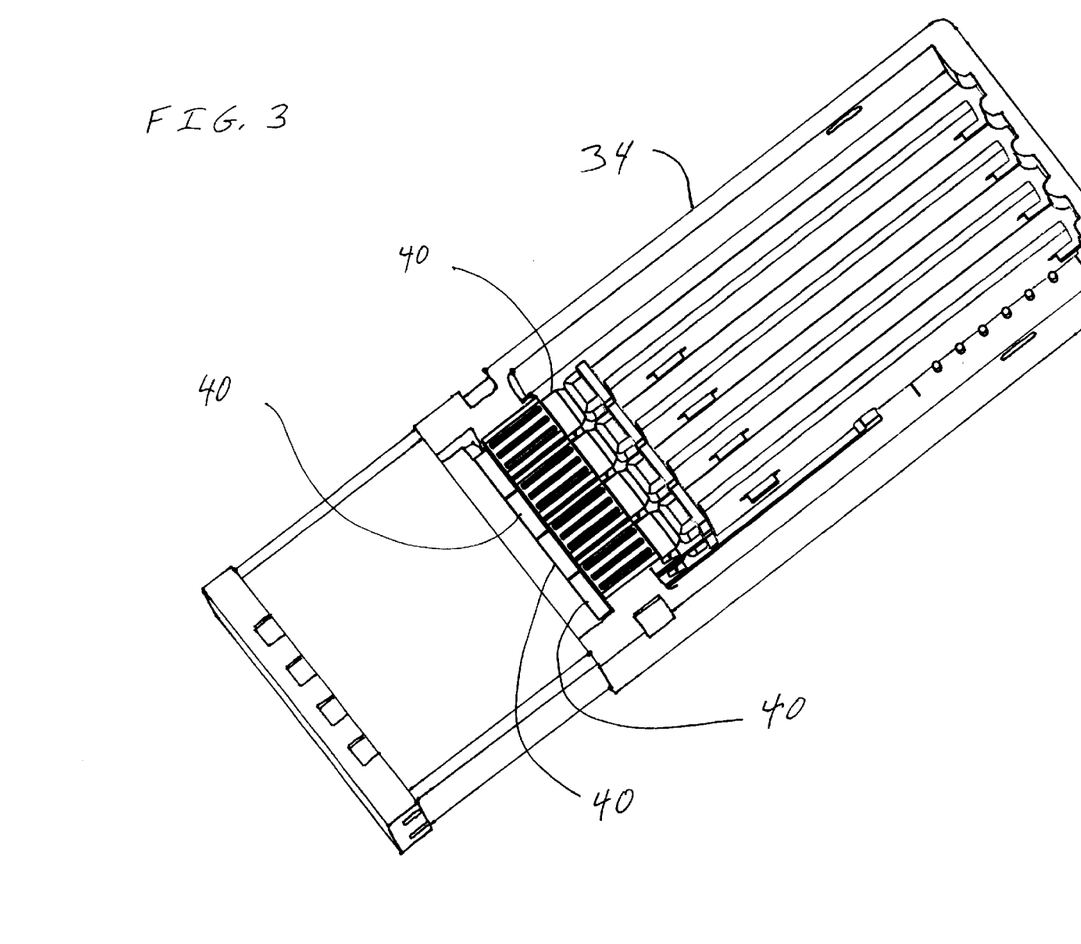
FIG. 3 is a perspective view of the optoelectronic transceiver array of FIG. 2 with the cover removed so as to reveal the four dual channel devices situated therein.

Each dual channel device 40 includes two optical subassemblies thus making it a dual channel device. The dual channel device 40 is insertable into the housing 34 and retained therein by the cover 32. FIG. 3 is a perspective view of the module 30 with the cover 32 removed so as to reveal the four dual channel devices 40 situated therein.

Figure 4:
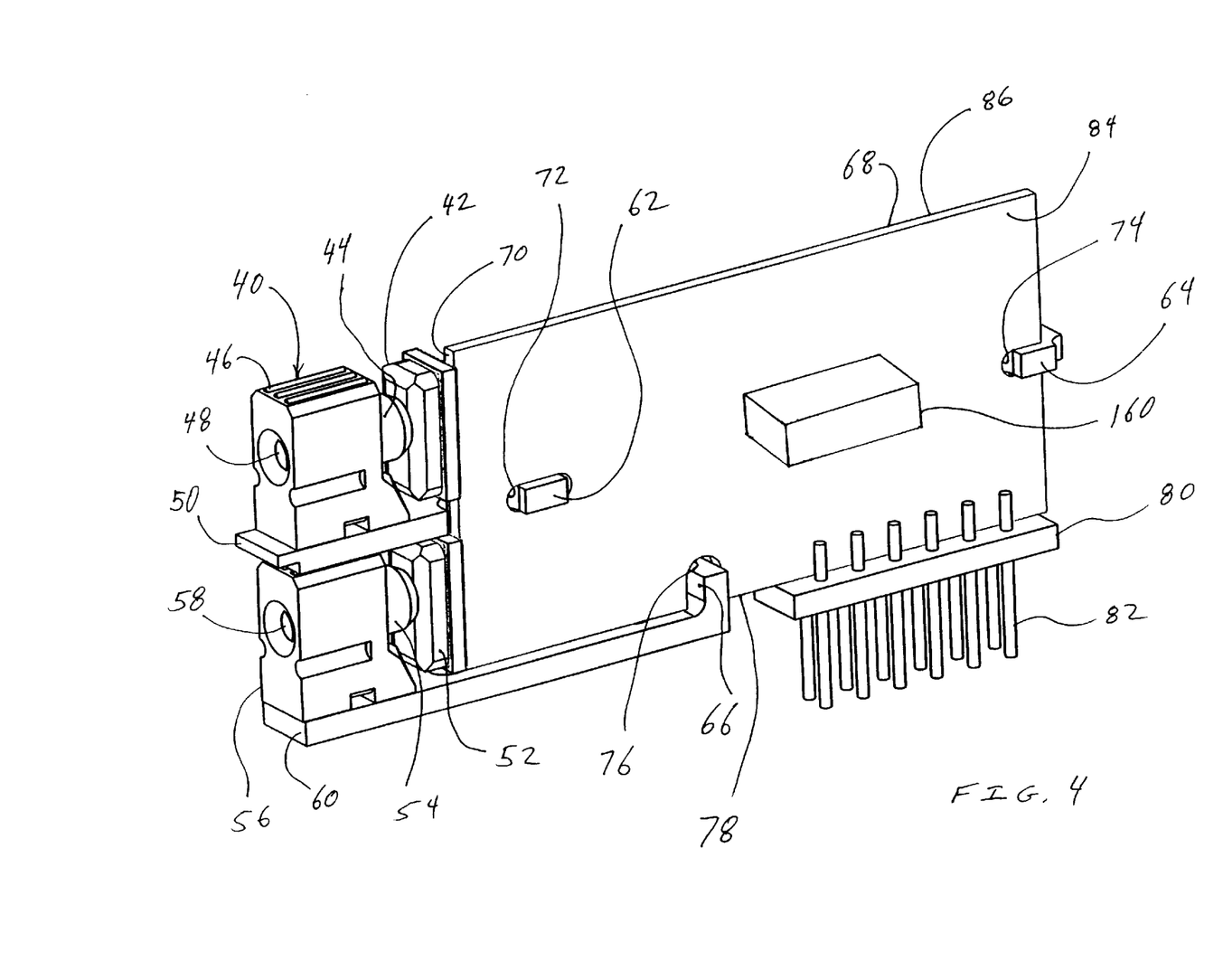
FIG. 4 is a perspective view of one of the four dual channel devices of FIG. 3.

FIG. 4 is a perspective view of one dual channel device 40 which includes a substrate 68, a first rib 50, a second rib 60, a first optical package 42, a second optical package 52, a first optical coupling element 46, a second optical coupling element 56, and a connection pin header 80. The first optical coupling element 46 includes a metal ring 44, and a ferrule receiving bore 48. The second optical coupling element 56 includes a metal ring 54, and a ferrule receiving bore 58. The body of each of the optical coupling elements 46, 56 is made of a polymer material onto which the metal rings 44, 54 are pressed. The metal rings 44, 54 are then used for attachment purposes to each of the respective optical packages 42, 52 by way of welding. Each optical coupling element 46, 56 may contain a focusing device located between the respective ferrule receiving bore 48, 58 and the respective optical package 42, 52.

Each optical package 42, 52 is electrically attached to an edge 70 of the substrate 68 by soldering. Optoelectronic packages and optical subassemblies are well known and by way of example are disclosed and discussed in U.S. Pat. Nos. 6,416,238 6,331,992 6,349,105; and U.S. Pat. application Ser. No. 09/826,480 all of which are hereby incorporated herein by reference. The optical subassemblies can both be transmitters, or they can both be receivers, or one optical package can be a transmitter and the other optical package can be a receiver.

The first optical coupling element 46 has projections which are pressed into apertures 100, 102 (see FIG. 7) of the first rib 50 so as to support the optical coupling element 46 and to prevent forces from being transmitted through the junction between the first optical package 42 and the substrate 68. Likewise, the second optical coupling element 56 has projections which are pressed into apertures 96, 98 (see FIG. 6) of the second rib 60 so as to support the optical coupling element 56 and to prevent forces from being transmitted through the junction between the second optical package 52 and the substrate 68. Such forces can break the electrical connection between the optical packages 42, 52 and the circuitry on the substrate 68 which is not desirable.

The first rib 50 includes a first tab 62 and a second tab 64. The first tab 62 of the first rib 50 is insertable into an aperture 72 of the substrate 68 and the second tab 64 is insertable into a cut-out 74 of the substrate 68. The second rib 60 includes a tab 66 that is insertable into a cut-out 76 of the substrate 68. The tabs 62, 64, 66 are secured to the substrate 68 by solder. Thus, forces applied to the optical coupling elements 46, 56 by a connector or plugs 10, 20 (see FIG. 1) are transmitted through the ribs 50, 60 and into the substrate 68 through the tabs 62, 64, 66. The ribs 50, 60 are made of a metallic material.

The substrate 68 is made of an electrically non-conductive ceramic material. Due to the small size of the dual channel device 40 the substrate 68 is very thin (i.e., 0.020 inch), as such, the substrate 68 is preferably made of alumina and forms a ceramic thick film circuit assembly. Typical printed circuit board materials such as FR4 are not well suited since such a thin substrate would result in a substrate that is not suitably rigid, mechanically. A substrate which is not suitably mechanically rigid may deflect too much and render the electronics adhered thereto unusable. Additionally, the ribs 50, 60 provide rigidity to the assembly of the substrate 68 and the ribs 50, 60.

Figure 5:
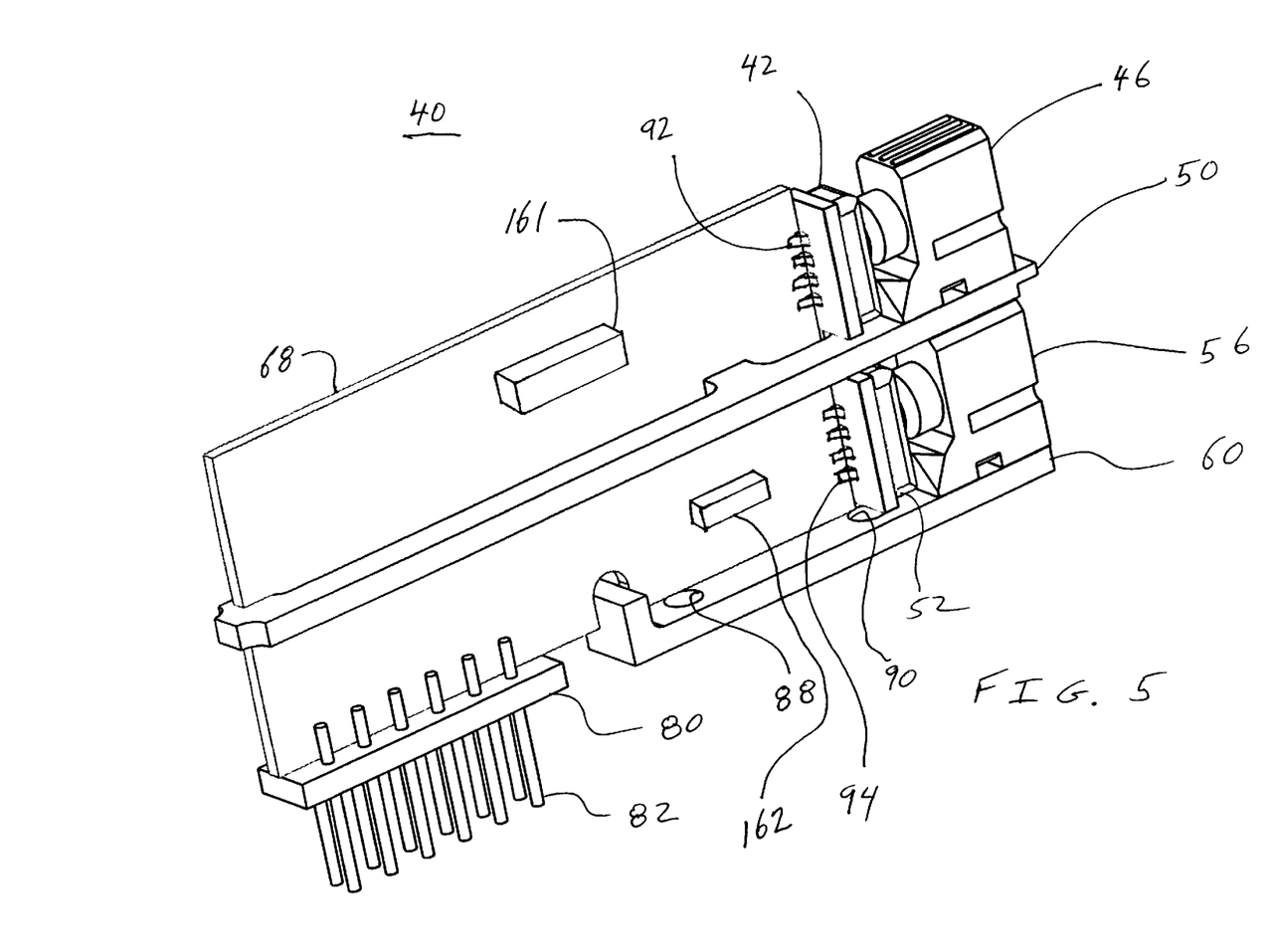
FIG. 5 is a perspective view of the dual channel device of FIG. 4 taken from another angle.

Components such as integrated circuit chips, resistors, capacitors, and inductors may be placed on the substrate 68. Numeral designator 160 represents an electrical component such as an integrated circuit chip, a resistor, a capacitor, and an inductor, or any other device. Furthermore, more than one electrical component can be placed on the substrate as shown in FIG. 5 which includes electrical components 161, 162 on the other side of the substrate 68. The electrical components 160, 161, 162 can be placed on both sides 84, 86 of the substrate 68 or on only one side of the substrate 68. No specific circuitry and components are shown on the substrate 68 in FIGS. 4 and 5, however, typical signal conditioning circuitry and elements are adhered thereto in practice. Such circuitry and elements are discussed in U.S. Pat. No. 5,638,390 and U.S. Reissue Pat. No. Re36,491 both of which are hereby incorporated herein by reference.

The connection pin header 80 includes a body made of a polymer material and connection pins 82 made of an electrically conductive metallic material. The connection pin header 80 includes twelve connection pins 82. Six connection pins 82 are associated with each side of the substrate 68. The connection pins 82 are soldered to conductive pads (not shown) on the substrate 68. Typically, six of the connection pins on one side 86 of the substrate 68 are associated with one of the optical packages and the remaining six connection pins 82 on the other side 84 of the substrate 68 are associated with the other optical package.

FIG. 5 further shows the electrical connection between the optical packages 42, 52 and the electronic circuitry on the substrate 68. The first optical package 42 is attached to the substrate 68 by solder 92 in four locations. Likewise, the second optical package 52 is attached to the substrate 68 by solder 94 in four locations. The second rib 60 further includes two apertures 88, 90 which are pressed over projections 116, 122 (see FIG. 10) formed in the housing 34 so as to secure and align the dual channel device 40 thereto.

Figure 6:
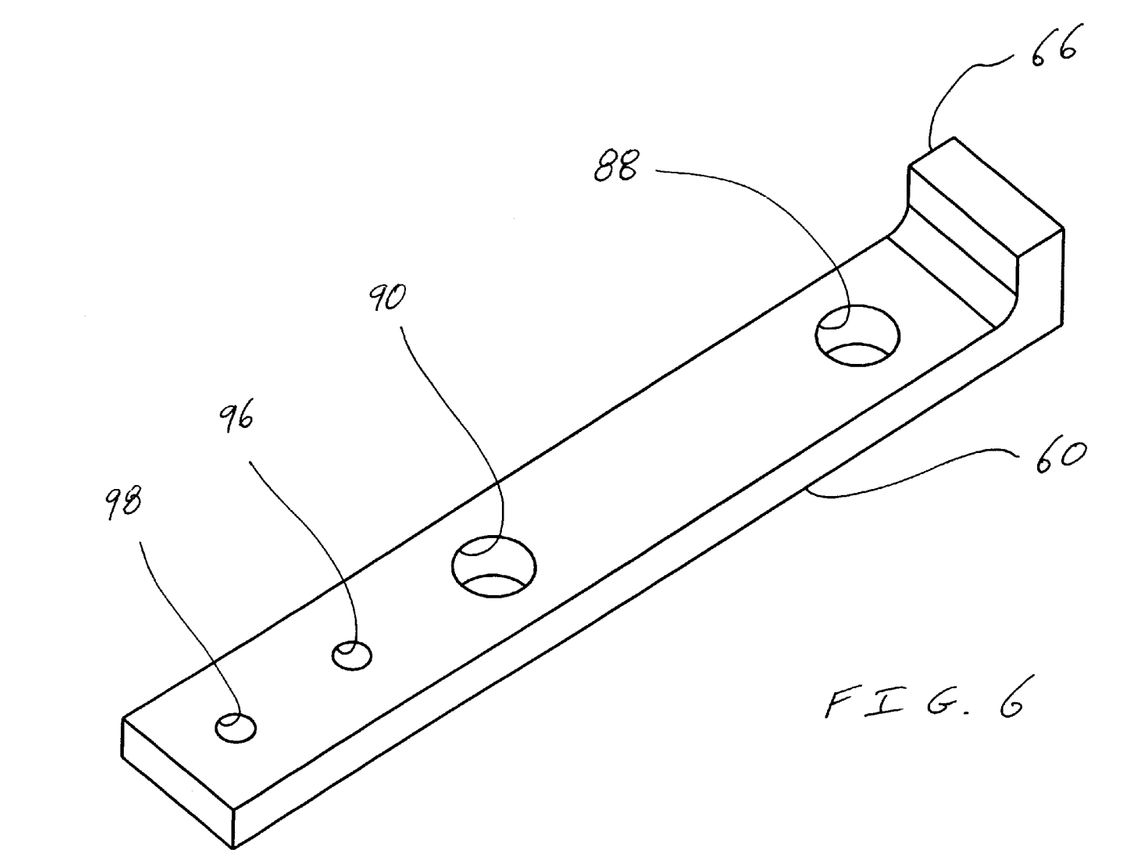
FIG. 6 is a perspective view of the edge base of the dual channel device of FIG. 5.

FIG. 6 is a perspective view showing the apertures 88, 90, 96, 98 and the tab 66 of the second rib 60. As discussed above, apertures 96, 98 receive projections formed on the bottom of the second optical coupling element 56, and apertures 88, 90 receive projections 116, 122 (see FIGS. 9 and 10) formed on the bottom inside surface of the housing 34.

Figure 7:
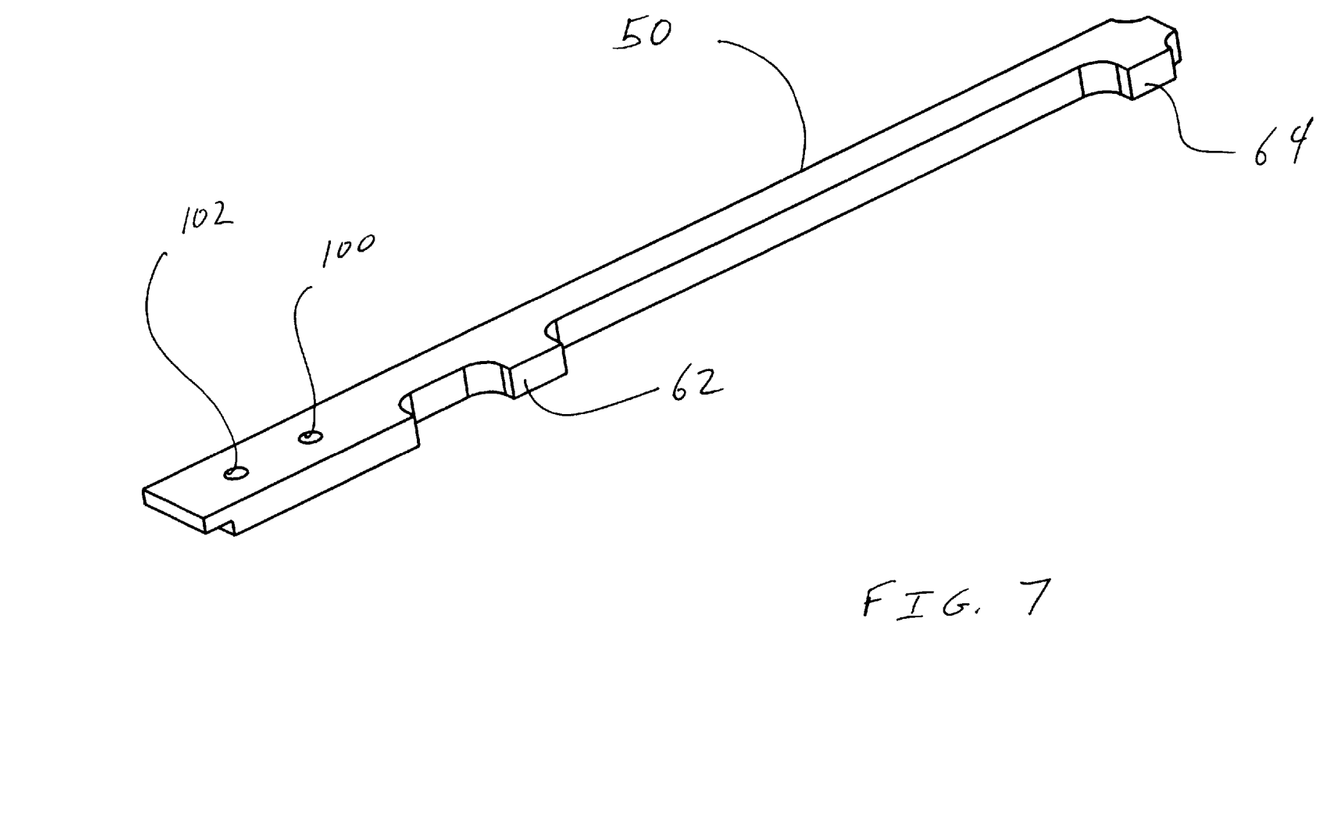
FIG. 7 is a perspective of the side base of the dual channel device of FIG. 5.

FIG. 7 is a perspective view of the first rib showing apertures 100, 102 and the first and second tabs 62, 64. As discussed above, the apertures 100, 102 receive projections formed on the bottom of the first optical coupling element 46.

Figure 8:
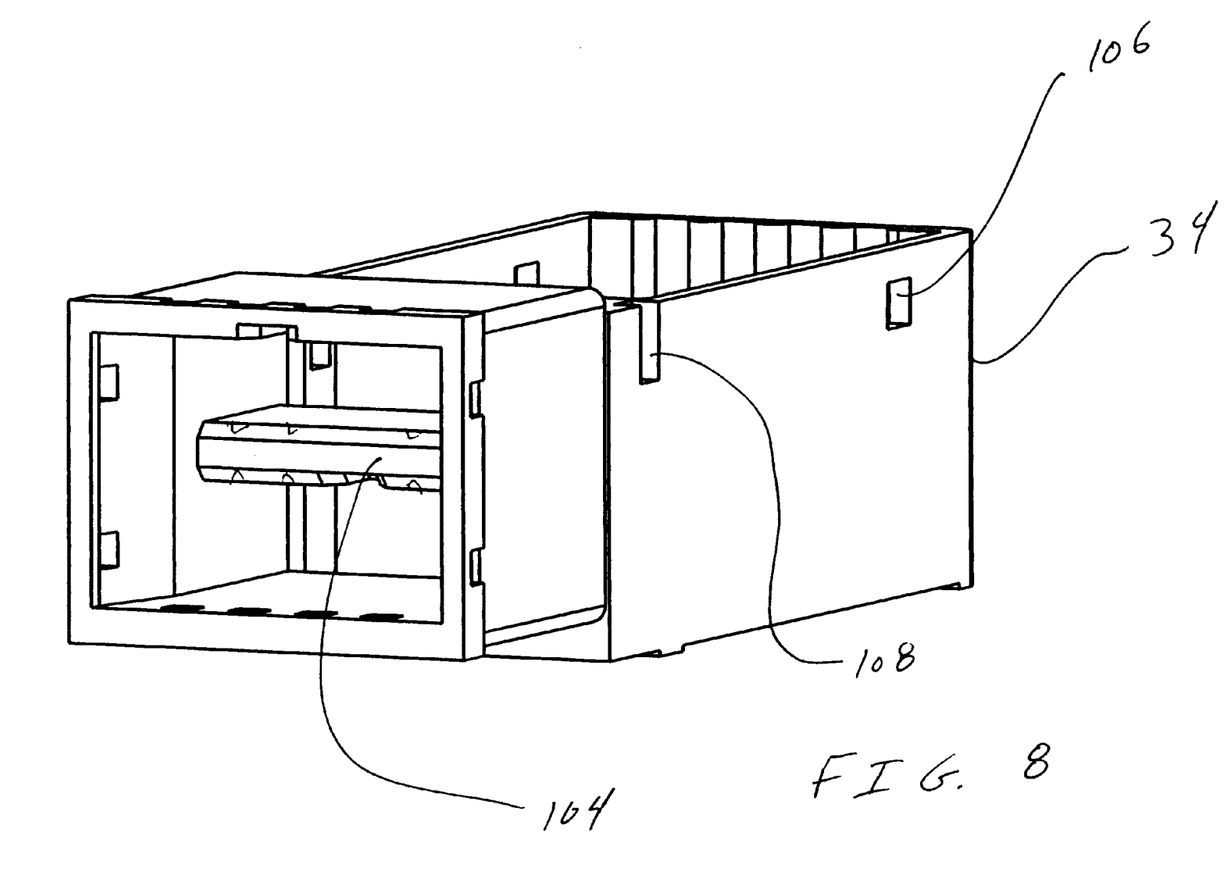
FIG. 8 is a perspective view of the housing of the optoelectronic transceiver array of FIG. 1.
Figure 9:
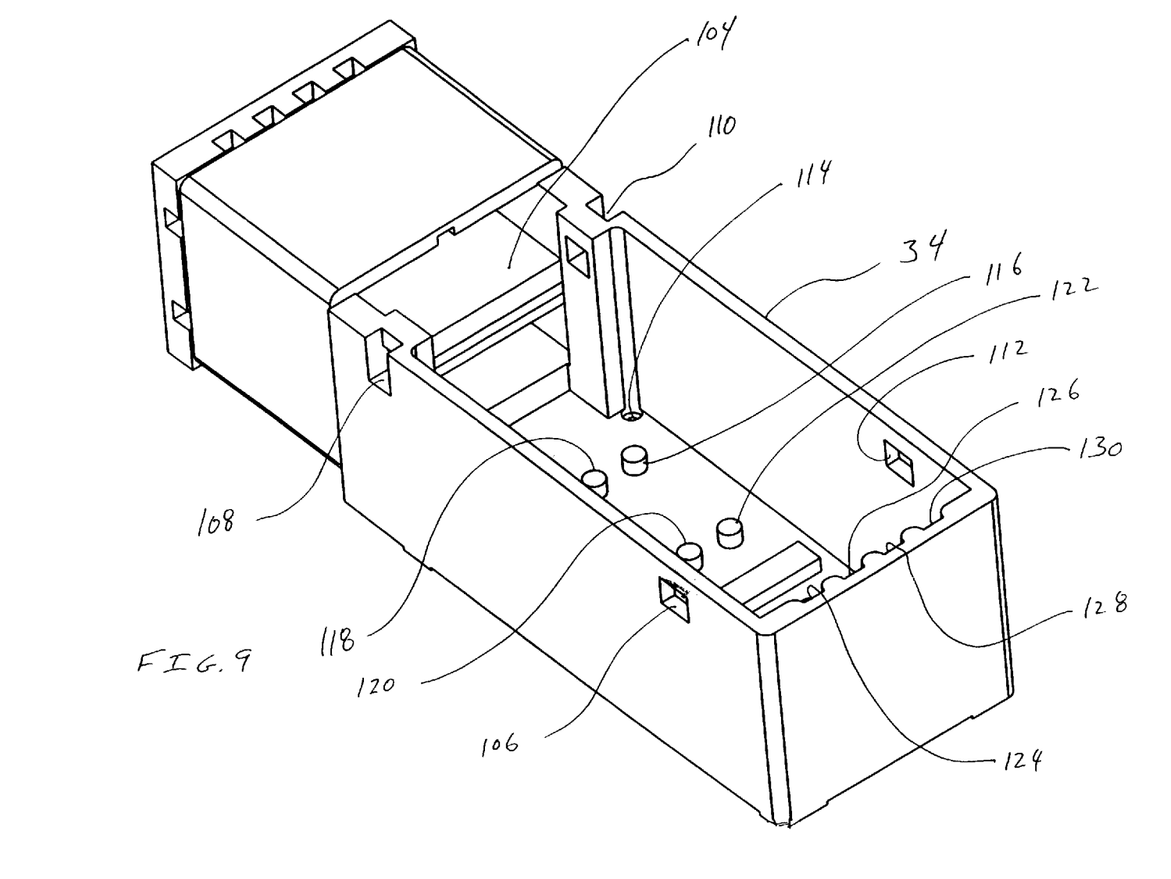
FIG. 9 is a perspective view of the housing of FIG. 8 taken from another angle.

FIG. 8 is a perspective view of the housing 34 which includes a ledge 104 and recesses 106, 108. The ledge 104 can have keying features formed in it so as to correctly orient plugs 10, 20 mating thereto. The recesses 106, 108 are formed so as to accept complementary features formed in the cover so as to retain the cover on the housing 34. FIG. 9 is another perspective view of the housing 34. This view shows additional recesses 110, 112 which are similar to the recesses 106, 108. Also shown are additional projections 118, 120 which are similar to the projections 116, 122 previously described so as to retain another second rib of another dual channel device 40. Slots 124, 126, 128, 130 are shown formed in the housing 34 and are used to help align and support the dual channel devices 40. The substrate of one dual channel device 40 is guided between walls of the slot as the dual channel device 40 is inserted into the housing.

Figure 10:
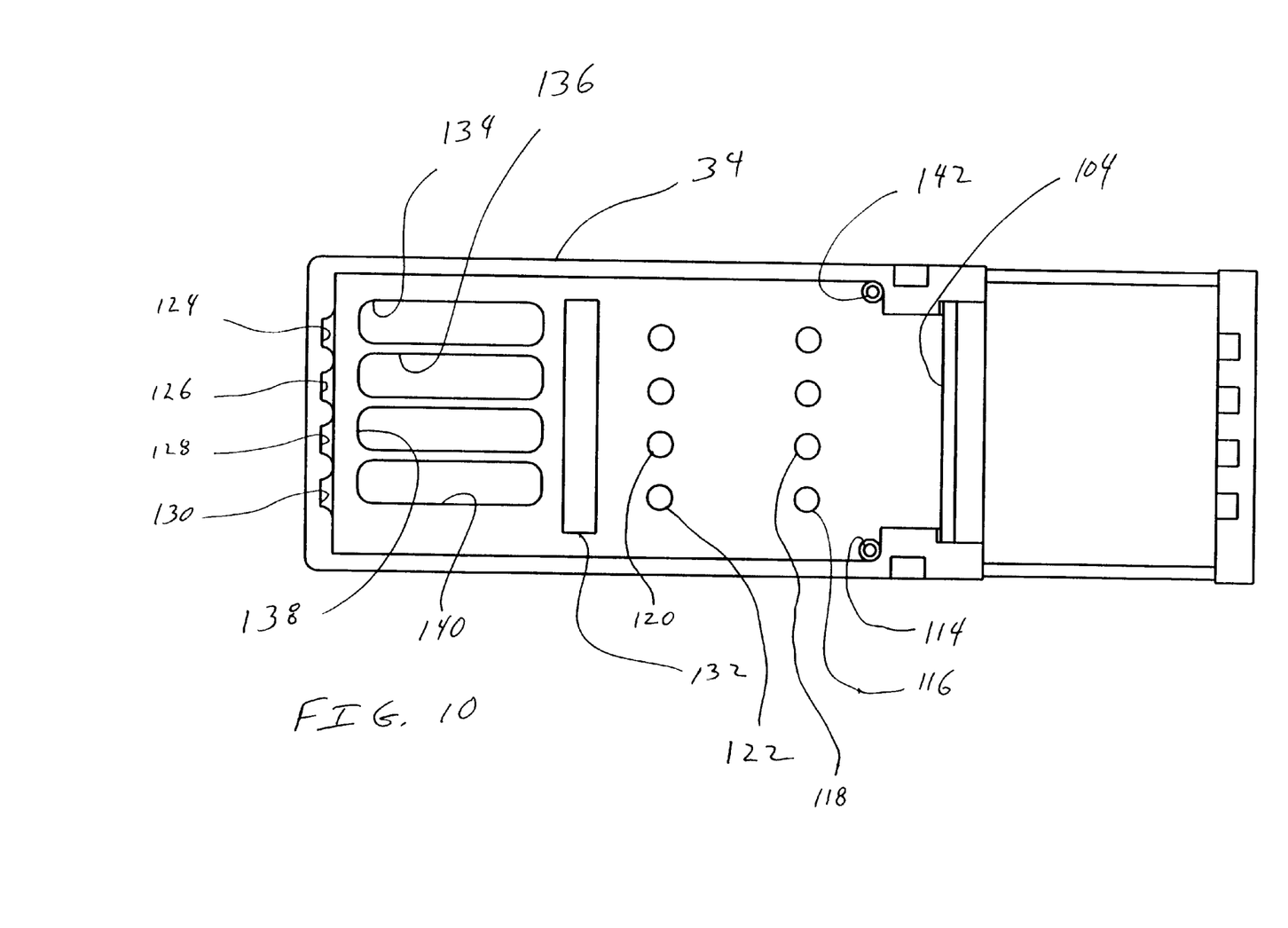
FIG. 10 is a plan view of a top of the housing of FIG. 8.

FIG. 10 is a top view of the housing 34 and shows the additional features of apertures 134, 136, 138, 140, a connection pin header retainer 132, and alignment pin holes 114, 142. The alignment pins 36, 38 are pressed into the alignment pin holes 114, 142. When a dual channel device 40 is mounted in the housing 34, the electrical connection pins 82 extend out of the housing through one of the apertures.

Figure 11:
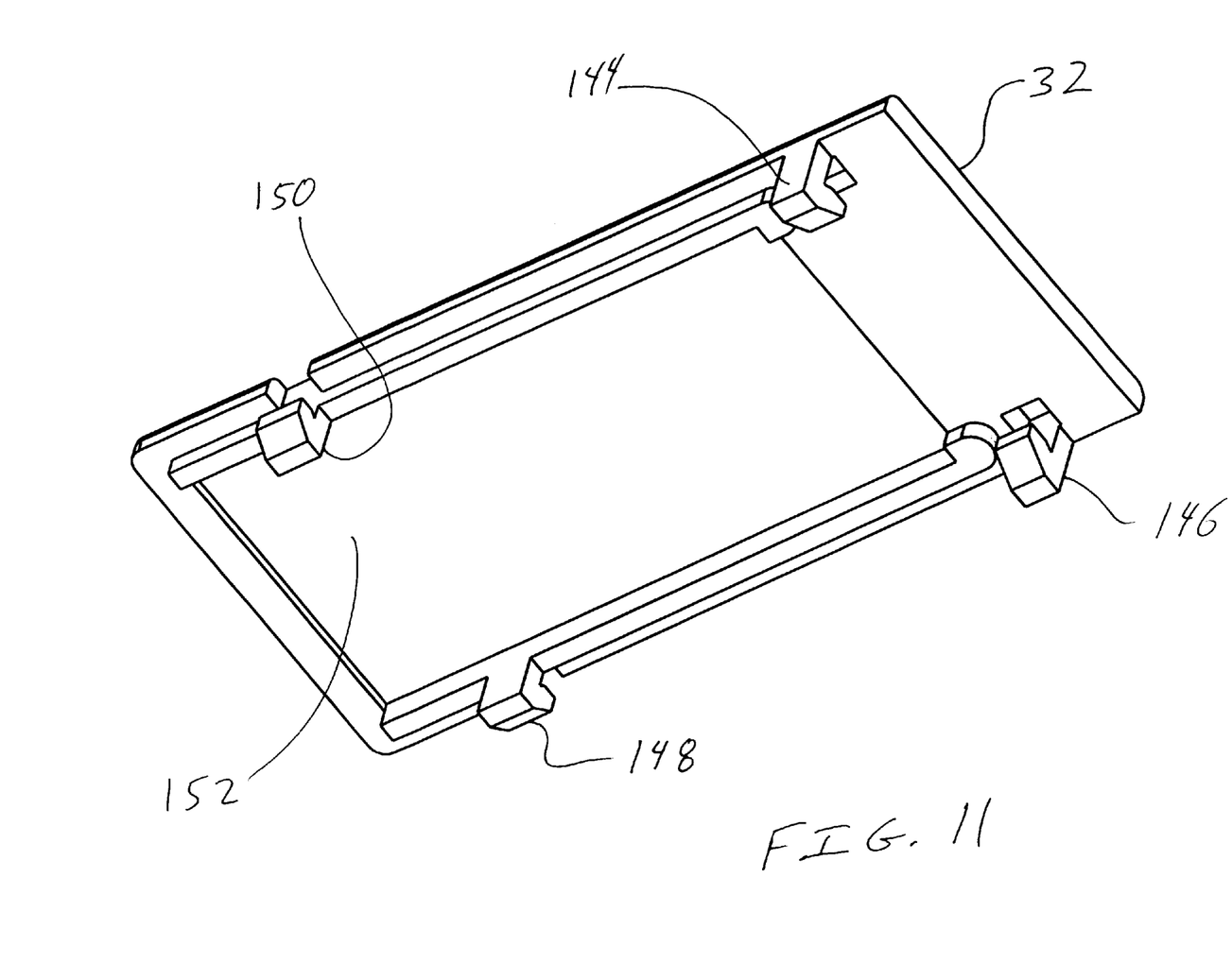
FIG. 11 is a perspective view of the cover of the optoelectronic transceiver array of FIG. 1.
Figure 12:
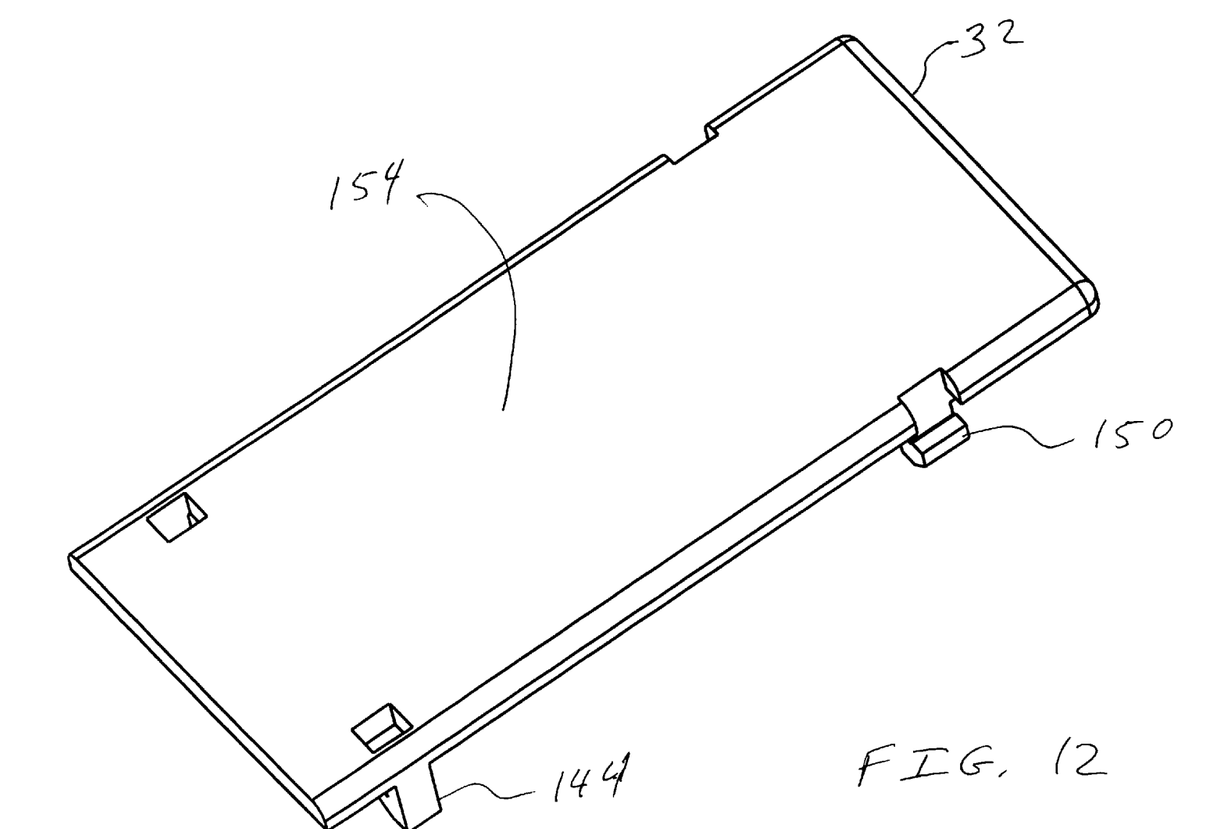
FIG. 12 is a perspective view of the cover of FIG. 11 taken from another angle.

FIG. 11 is a perspective view of the cover 32. The cover 32 includes an interior surface 152, and four snap projections 144, 146, 148, 150. Snap projection 144 mates with recess 110 of the housing 34. Snap projection 146 mates with recess 108 of the housing 34. Snap projection 148 mates with recess 106 of the housing 34. Snap projection 150 mates with recess 112 of the housing 34. FIG. 12 is another perspective view of the cover 32 which shows the exterior surface 154. To provide the needed displacement of the snap projections during assembly without the snap projections yielding, the cover 32 is preferably made of a polymer material.

When a dual channel optoelectronic device 40 is inserted into the housing 34, an end of the second rib 60 and an end of the connection pin header 80 (see FIG. 5) straddle the header retainer projection 132 (see FIG. 10) formed on the bottom interior surface of the housing 34. The housing 34 accommodates four dual channel optoelectronic devices 40. When the cover 32 is mounted on the housing 34, the interior surface 152 helps to retain the four dual channel optoelectronic devices 40. In an effort to reduce the emissions of EMI/RFI emanating from the module 30, the exterior surfaces of the cover 32 and the housing 34 can be metallized or the housing may be formed of a die cast zinc-aluminum alloy. The assembled module 30 provides for a high density optoelectronic device. When the module 30 is mounted on a printed circuit board, the alignment pins 36, 38 fit into alignment holes provided on the printed circuit board and the electrical connection pins fit into holes provided in the printed circuit board and are soldered thereto. Module 30 has forty-eight connection pins, and four substrates. However, module 30 includes eight optical packages.

Obviously, numerous modifications and variations of the present invention are possible in light of the above teachings. It is therefore to be understood that within the scope of the appended claims, the invention may be practiced otherwise than as specifically described herein.

What is claimed is:

1. A dual channel optoelectronic device comprising:
    a first optical package;
    a second optical package;
    a substrate having electronic circuitry mounted thereon, the first and second optical packages electrically connected to the electronic circuitry, the substrate having an edge, the first optical package mounted adjacent to and along the edge, and the second optical package mounted adjacent to and along the edge;
    a connection pin header having connection pins, the connection pins electrically connected to the electronic circuitry on the substrate;
    a first optical coupling element having a first ferrule receiving bore, the first optical coupling element attached to the first optical package;
    a second optical coupling element having a second ferrule receiving bore, the second optical coupling element attached to the second optical package, the second ferrule receiving bore of the second optical coupling element being substantially parallel to the first ferrule receiving bore of the first optical coupling element;
    a first rib connected to the first optical coupling element and to the substrate so as to provide support for the first optical coupling element, the first rib connected to the substrate at two locations, the first rib having a first length, the first length of the first rib being greater than a length of the substrate; and
    a second rib connected to the second optical coupling element and to the substrate so as to provide support for the second optical coupling element, the second rib having a second length, and wherein
    the first length of the first rib is greater than the second length of the second rib, and wherein
    the first rib exists substantially in a first plane, the second rib exists substantially in a second plane, and the substrate exists substantially in a third plane, and wherein the first plane is substantially parallel to the second plane, and wherein the third plane is substantially perpendicular to both the first plane and the second plane.

2. A dual channel optoelectronic device according to claim 1 wherein the substrate is made of a ceramic material.

3. A dual channel optoelectronic device according to claim 1 wherein the substrate is made of an alumina material.

4. A dual channel optoelectronic device according to claim 2 wherein the first rib and the second rib are made of a metallic material.

5. A dual channel optoelectronic device according to claim 4 wherein the connection pins of the connection pin header include twelve connection pins.

6. A dual channel optoelectronic device according to claim 5 wherein a first set of six connection pins of the twelve connection pins being associated with the first optical package, and a second set of six connection pins of the twelve connection pins being associated with the second optical package.

7. A dual channel optoelectronic device according to claim 6 wherein the first optical package is attached to the substrate by a soldering technique.

8. A dual channel optoelectronic device according to claim 7 wherein the second optical package is attached to the substrate by a soldering technique.

9. A dual channel optoelectronic device according to claim 8 wherein the first optical package is a transmitter.

10. A dual channel optoelectronic device according to claim 9 wherein the second optical package is a receiver.

11. An optoelectronic device comprising:
    a housing;
    a first optical package;
    a second optical package;
    a third optical package;
    a fourth optical package;
    first electronic circuitry;
    second electronic circuitry;
    a first substrate having the first electronic circuitry mounted thereon, the first and second optical packages electrically connected to the first electronic circuitry, the first substrate having a first edge, the first optical package mounted adjacent to and along the first edge, and the second optical package mounted adjacent to and along the first edge;
    a first connection pin header having a first set of connection pins, the first set of connection pins electrically connected to the first electronic circuitry on the first substrate;
    a first optical coupling element having a first ferrule receiving bore, the first optical coupling element attached to the first optical package;

a second optical coupling element having a second ferrule receiving bore, the second optical coupling element attached to the second optical package;

a first rib connected to the first optical coupling element and to the first substrate so as to provide support for the first optical coupling element, the first rib connected to the first substrate at two locations, the first rib having a first length, the first length of the first rib being greater than a length of the first substrate;

a second rib connected to the second optical coupling element and to the first substrate so as to provide support for the second optical coupling element, the second rib having a second length, and wherein the first length of the first rib is greater than the second length of the second rib;

a second substrate having the second electronic circuitry mounted thereon, the third and fourth optical packages electrically connected to the second electronic circuitry, the second substrate having a second edge, the third optical package mounted adjacent to the second edge, and the fourth optical package mounted adjacent to the second edge;

a second connection pin header having a second set of connection pins, the second set of connection pins electrically connected to the second electronic circuitry on the second substrate;

a third optical coupling element having a third ferrule receiving bore, the third optical coupling element attached to the third optical package;

a fourth optical coupling element having a fourth ferrule receiving bore, the fourth optical coupling element attached to the fourth optical package;

a third rib connected to the third optical coupling element and to the second substrate so as to provide support for the third optical coupling element, the third rib connected to the second substrate at two locations, the third rib having a third length, the third length of the third rib being greater than a length of the second substrate;

a fourth rib connected to the fourth optical coupling element and to the second substrate so as to provide support for the fourth optical coupling element, the fourth rib having a fourth length, and wherein the third length of the third rib is greater than the fourth length of the fourth rib; and a cover removeably attached to the housing so as to retain the first substrate and the second substrate between the housing and the cover when the cover is attached to the housing, and wherein the first rib exists substantially in a first plane, the second rib exists substantially in a second plane, and the first substrate exists substantially in a third plane, and wherein the first plane is substantially parallel to the second plane, and wherein the third plane is substantially perpendicular to both the first plane and the second plane, and wherein the third rib exists substantially in a fourth plane, the fourth rib exists substantially in a fifth plane, and the second substrate exists substantially in a sixth plane, and wherein the fourth plane is substantially parallel to the fifth plane, and wherein the sixth plane is substantially perpendicular to both the fourth plane and the fifth plane, and wherein the third plane is substantially parallel to the sixth plane, and wherein the first ferrule receiving bore is substantially parallel to the second ferrule receiving bore, the third ferrule receiving bore, and the fourth ferrule receiving bore.

12. An optoelectronic device according to claim 11 wherein the first substrate and the second substrate are made of a ceramic material.

13. An optoelectronic device according to claim 12 wherein the first rib, the second rib, the third rib, and the fourth rib are made of a metallic material.

14. An optoelectronic device according to claim 13 wherein the housing and the cover are made of a polymer material.

15. An optoelectronic device according to claim 14 wherein the housing and the cover are metallized.

16. An optoelectronic device according to claim 15 wherein the first optical package is a transmitter and the fourth optical package is a receiver.

* * * * *